United States Patent
Shirahata

(10) Patent No.: US 9,291,937 B2
(45) Date of Patent: Mar. 22, 2016

(54) IMAGE FORMING APPARATUS THAT CALCULATES CORRECTION VALUE FOR GENERATING PSEUDO BD SIGNAL DURING PERIOD UNTIL POLYGON MIRROR REACHES STEADY ROTATION

(71) Applicant: CANON KABUSHIKI KAISHA, Tokyo (JP)

(72) Inventor: Norihiro Shirahata, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/625,953

(22) Filed: Feb. 19, 2015

(65) Prior Publication Data
US 2015/0241811 A1 Aug. 27, 2015

(30) Foreign Application Priority Data
Feb. 21, 2014 (JP) ................................. 2014-031723

(51) Int. Cl.
*B41J 2/435* (2006.01)
*B41J 2/47* (2006.01)
*G03G 15/043* (2006.01)
(52) U.S. Cl.
CPC .................................... *G03G 15/043* (2013.01)
(58) Field of Classification Search
USPC ......... 347/116, 229, 234, 235, 243, 248–250, 347/259–260; 399/70, 301
See application file for complete search history.

(56) References Cited

U.S. PATENT DOCUMENTS 6,856,338 B2 * 2/2005 Takahashi et al. ............ 347/225
8,670,014 B2 * 3/2014 Shoji et al. .................... 347/235

FOREIGN PATENT DOCUMENTS

JP H04-313776 A 11/1992
JP 4393133 B2 1/2010

* cited by examiner

*Primary Examiner* — Hai C Pham
(74) *Attorney, Agent, or Firm* — Canon U.S.A., Inc. IP Division

(57) ABSTRACT

An image forming apparatus includes a rotating polygon mirror configured to rotate and reflect the first laser beam and the second laser beam, a first generation unit configured to generate a first signal based on timings at which the respective first laser beams, a second generation unit configured to generate a second signal for determining a timing to form an electrostatic latent image on the second image bearing member with the second laser beam based on the first signal and a correction value, and a calculation unit configured to calculate the correction value based on the output of the detection unit, in which the calculation unit calculates the correction value based on the signal output from the detection unit in a period of time that has passed until the rotating polygon mirror reaches steady rotation since it has started to be driven to rotate.

8 Claims, 12 Drawing Sheets

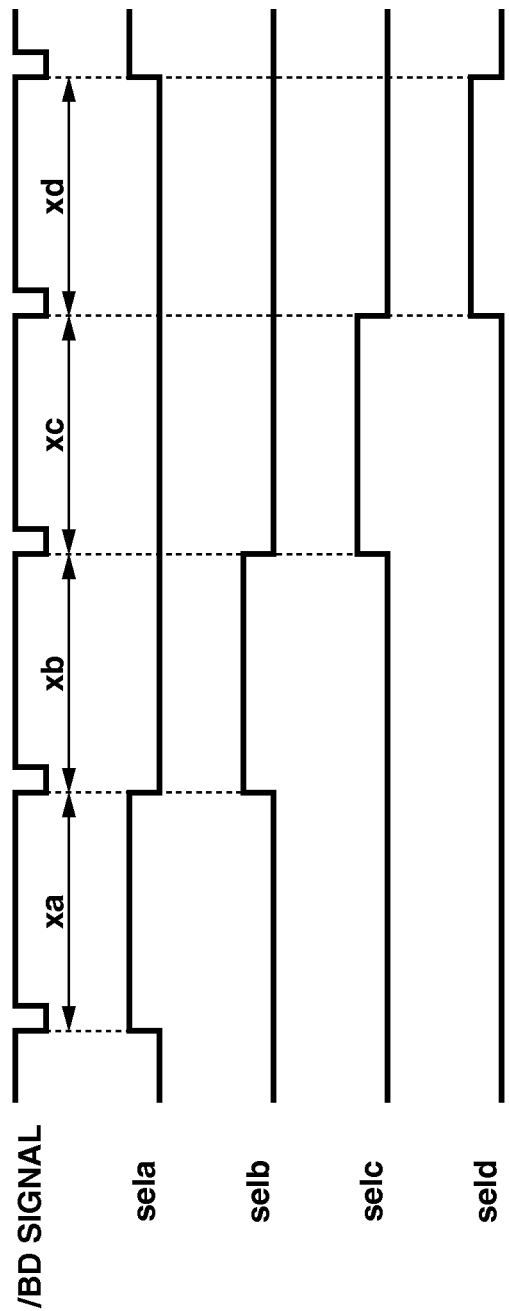

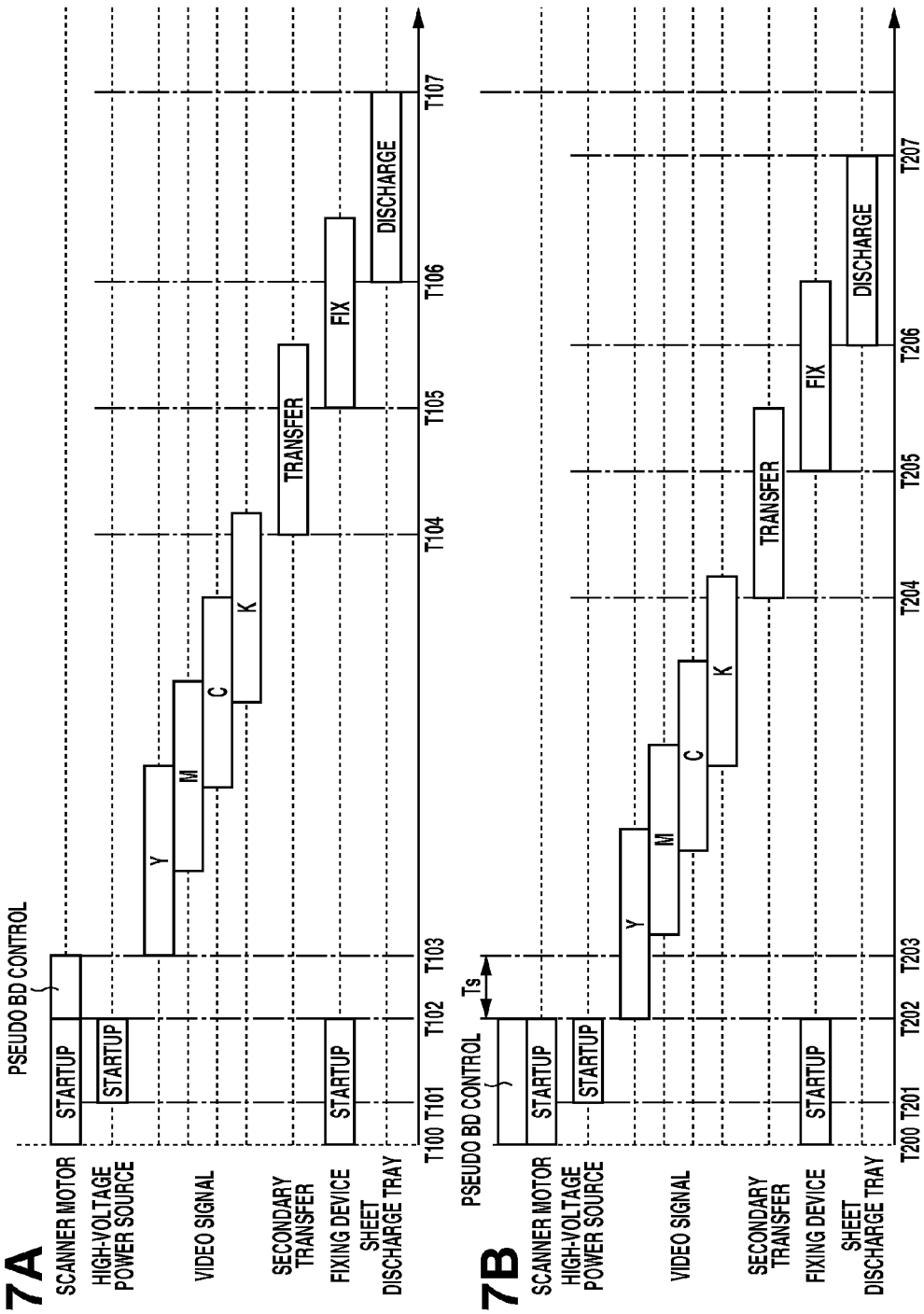

BROKEN LINE: IDEAL POLYGON MIRROR

SOLID LINE: ACTUAL POLYGON MIRROR

α

B SURFACE
C SURFACE
A SURFACE
D SURFACE

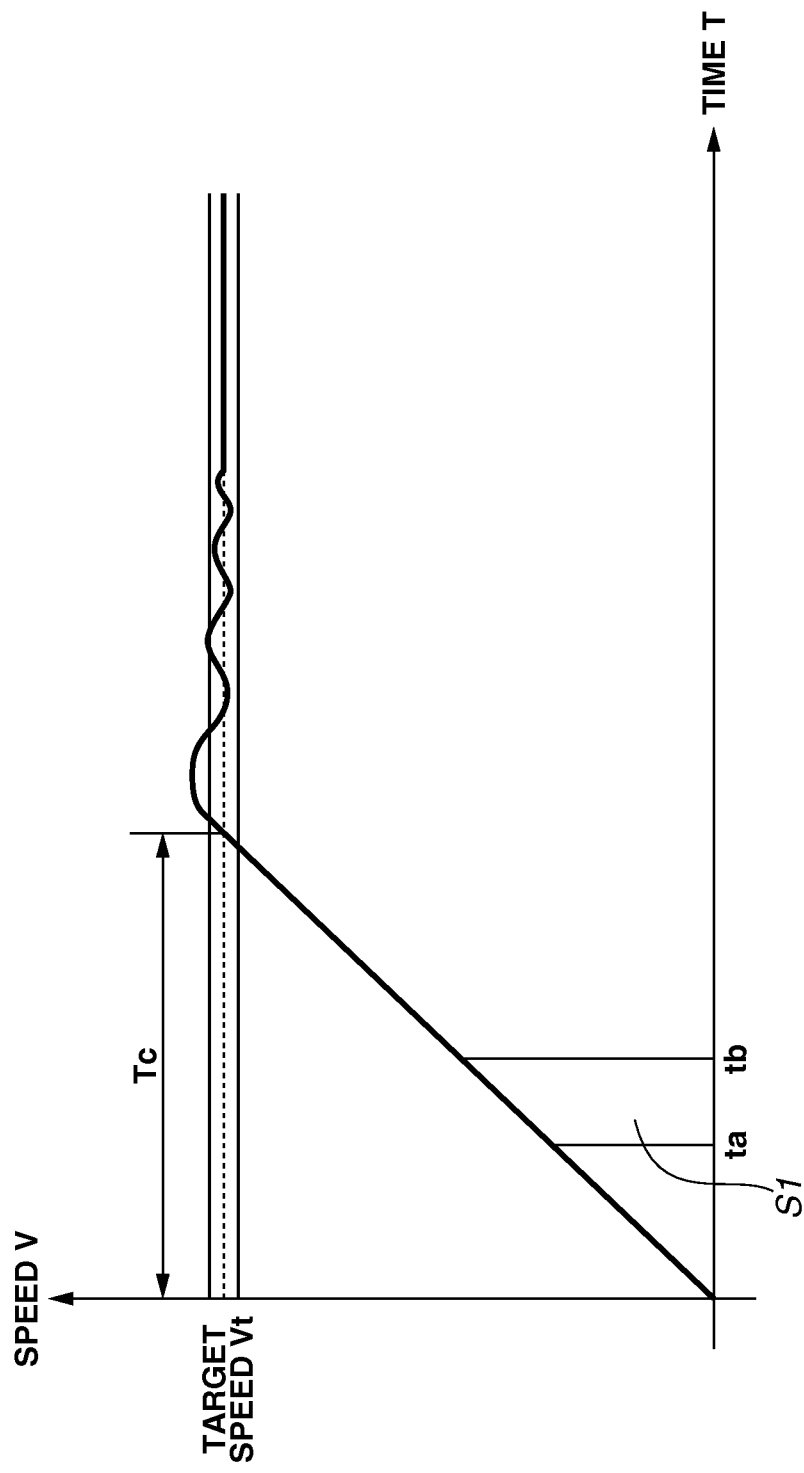

IMAGE FORMING APPARATUS THAT CALCULATES CORRECTION VALUE FOR GENERATING PSEUDO BD SIGNAL DURING PERIOD UNTIL POLYGON MIRROR REACHES STEADY ROTATION

BACKGROUND OF THE INVENTION

1. Field of the Invention

The present invention relates to an image forming apparatus.

2. Description of the Related Art

Conventionally, a color-image forming apparatus using an electrophotographic system has performed image formation by reflecting a laser beam modulated in response to an image signal from a polygon mirror serving as a rotating polygon mirror and scanning a photosensitive drum with the reflected laser beam to form an electrostatic latent image. In such an image forming apparatus, when a plurality of scanners including light sources for laser beams in colors is used, a main body of the apparatus increases in size and the apparatus increases in cost.

To miniaturize the apparatus and reduce the cost thereof, a configuration in which a common scanner is used for a plurality of colors has been known. Furthermore, Japanese Patent Application Laid-Open No. 4-313776 discusses using a common scanner for a plurality of colors and providing a beam detect (BD) sensor for one of a plurality of light sources.

Japanese Patent Publication No. 4393133 discusses measuring, if an error α occurs on each of mirror surfaces of a polygon mirror (see FIG. 8A), a period of a BD signal when the mirror surface of the polygon mirror is scanned with a laser, using a BD sensor, and calculating a correction value for each mirror surface to correct the error.

By adding the correction value, it is possible to generate an accurate BD signal for light sources other than a light source provided with the BD sensor even if a plane division error occurs on each of the mirror surfaces of the polygon mirror. The BD signal for the light source other than the light source provided with the BD sensor is referred to as a pseudo BD signal.

In a configuration in which the pseudo BD signal is generated, discussed in Japanese Patent Publication No. 4393133, a scanner is started after a print instruction is received so that the polygon mirror converges at a rotation speed for performing image formation (a steady rotation state), and a correction value for generating the pseudo BD signal is then calculated. Then, the image formation is started. Thus, the start of the image formation is delayed by a period of time during which the correction value for generating the pseudo BD signal is calculated compared with a configuration in which the pseudo BD signal need not be corrected. As a result, a first print output time serving as a period of time that has passed until image formation on the first recording medium is completed since the print instruction has been received is extended.

SUMMARY OF THE INVENTION

The present invention is directed to suppressing extension of a first print output time. The present invention is directed to providing an image forming apparatus including a first light source configured to emit a first laser beam and a second light source configured to emit a second laser beam, a first image bearing member and a second image bearing member configured to bear a developer image, a rotating polygon mirror configured to rotate and reflect the first laser beam and the second laser beam to scan the first bearing member with the first laser beam and scan the second bearing member with the second laser beam, a mirror surface reflecting the second laser beam is different from a mirror surface reflecting the first laser beam at the same time, a direction of reflecting the second laser beam is different from a direction of reflecting the first laser beam at the same time, a first generation unit configured to generate a first signal for determining a timing to form an electrostatic latent image on the first image bearing member with the first laser beam based on timings at which the respective first laser beams, which have been reflected from the mirror surfaces, are sequentially detected by the detection unit, a second generation unit configured to generate a second signal for determining a timing to form an electrostatic latent image on the second image bearing member with the second laser beam reflected from the mirror surface different from the mirror surface reflecting the first laser beam based on the first signal and a correction value, in which the calculation unit calculates the correction value based on the signal output from the detection unit in a period of time that has passed until the rotating polygon mirror reaches steady rotation since it has started to be driven to rotate.

Further features of the present invention will become apparent from the following description of exemplary embodiments with reference to the attached drawings.

BRIEF DESCRIPTION OF THE DRAWINGS

FIG. 6 is a timing chart for determining respective positions of polygonal surfaces by circuits in the ASIC.

FIGS. 7A and 7B are timing charts for illustrating a print sequence.

FIG. 9 is a graph illustrating a relationship between a speed and a time at the time when the polygon mirror is driven to rotate.

DESCRIPTION OF THE EMBODIMENTS

Exemplary embodiments for implementing the present invention will be specifically described below with reference to the drawings. However, dimensions, materials, and shapes of components described in the exemplary embodiment and their relative arrangement are to be changed, as needed, according to a configuration of an apparatus for which the present invention is employed and various conditions. That is, the scope of the present invention is not intended to be limited to the embodiments, described below.

<Image Forming Apparatus>

Figure 1:
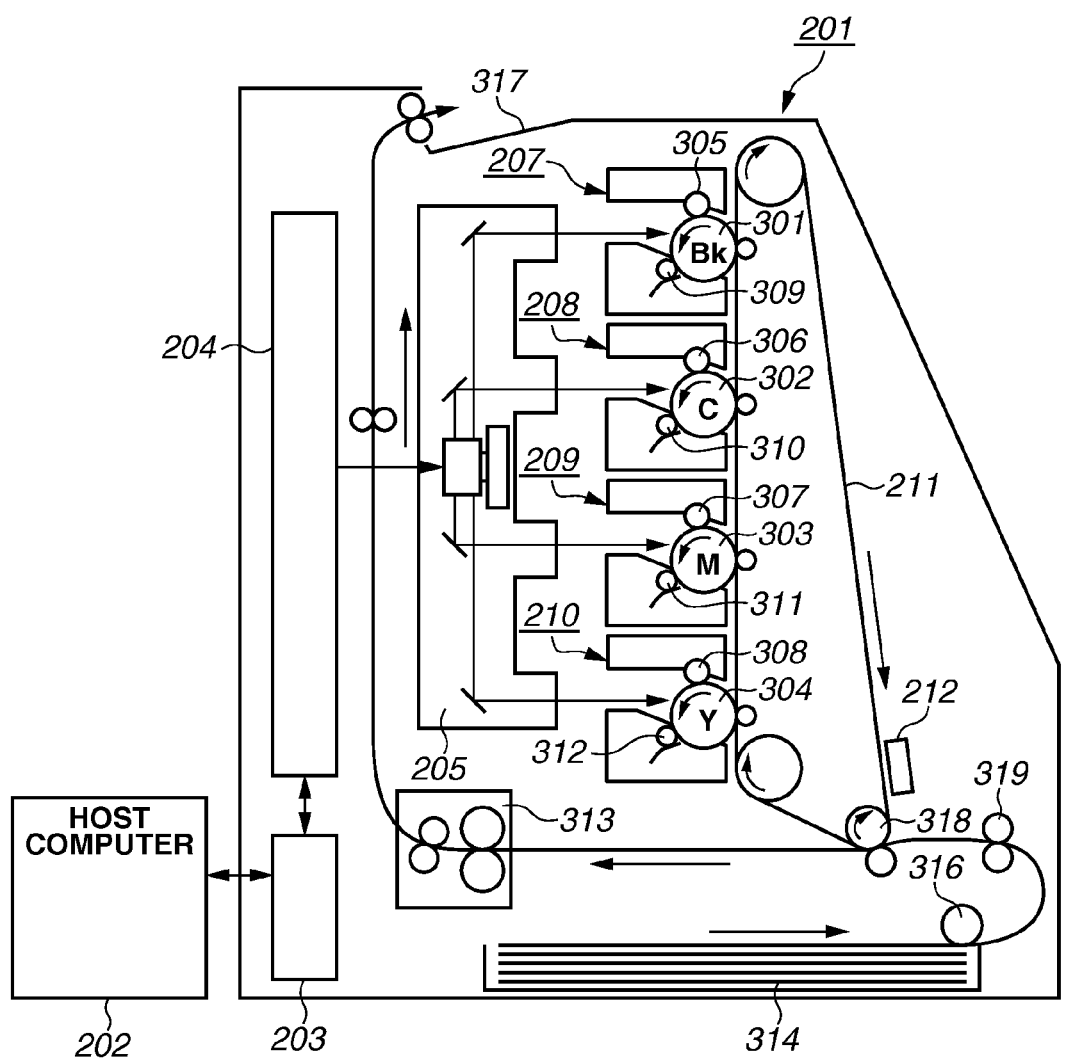
FIG. 1 is a schematic sectional view illustrating a schematic configuration of a printer according to the present exemplary embodiment.

A color laser printer (hereinafter referred to as a printer) 201 serving as an image forming apparatus according to a first exemplary embodiment will be described below with reference to FIG. 1. FIG. 1 is a schematic sectional view illustrating a schematic configuration of the printer according to the present exemplary embodiment. The printer 201 is connected to a host computer 202 and a server (not illustrated). The printer 201 includes four image forming units to form a color image obtained by overlapping images in four colors (yellow Y, magenta M, cyan C, and black BK).

The image forming unit includes toner cartridges 207 to 210 respectively having photosensitive drums 301 to 304 serving as image bearing members, and a scanner unit 205 having a laser diode for generating a laser beam as a light source for image exposure (a light source).

The printer 201 starts a printing operation when it receives a print instruction and image data from the host computer 202. Specifically, first, each of operation portions in the printer 201 starts a startup operation. Simultaneously, a video controller 203 in the printer 201 rasterizes the received image data into desired video signal formation data (e.g., bit map data), to generate a video signal for image formation. When the startup of each of the operation portions in the printer 201 is completed, the video signal is transmitted to an engine controller 204. The video controller 203 and the engine controller 204 transmit and receive information via serial communication. The engine controller 204 drives the laser diode in the scanner unit 205 in response to the video signal. Thus, respective electrostatic latent images are formed on the photosensitive drums 301 to 304 surfaces of which have been charged by charging rollers (not illustrated) serving as charging means in the toner cartridges 207 to 210.

The photosensitive drums 301, 302, 303, and 304 are used to form respective electrostatic latent images in black BK, cyan C, magenta M, and yellow Y. In the respective toner cartridges 207 to 210, respective toners (developers) are supplied so that the electrostatic latent images formed on the photosensitive drums 301 to 304 are visualized (developed), to form toner images (developer images) on the photosensitive drums 301 to 304. Among the toner images in black BK, cyan C, magenta M, and yellow Y formed on the photosensitive drums 301 to 304 (image bearing members), the image in yellow Y is first transferred onto an intermediate transfer belt 211 serving as an endless belt capable of performing cyclic movement, and the images in magenta M, cyan C, and black BK are sequentially transferred in this order to be superimposed on the image in yellow Y (primary transfer). Thus, a color image is formed on the intermediate transfer belt 211. The intermediate transfer belt 211 contacts each of the photosensitive drums 301 to 304, to form a transfer nip.

In the toner cartridges 207 to 210, development devices 309 to 312 serving as development means and cleaning devices 305 to 308 are respectively disposed. A recording material such as paper in a cassette 314 is fed to a registration roller 319 by a feeding roller 316, and is conveyed in synchronization with the color image on the intermediate transfer belt 211 depending on a timing at which the registration roller 319 is driven. A transfer roller 318 transfers the color image onto the recording material from the intermediate transfer belt 211 (secondary transfer). The recording material on which the color image has been transferred is conveyed to a fixing device 313. The fixing device 313 fixes the color image onto the recording material with heat and pressure. Then, the recording material on which the color image has been fixed is discharged onto a discharge tray 317 in an upper part of the printer 201.

The printer 201 includes a registration detecting sensor 212 that monitors a registration position of the color image on the intermediate transfer belt 211. The registration detecting sensor 212 reads a position of the image in each of the colors formed on the intermediate transfer belt 211 at a desired timing other than the time when image formation is performed, and feeds back data representing the position of the image to the video controller 203 or the engine controller 204. Thus, color shift can be prevented by adjusting the registration position of the image in each of the colors.

<Scanner Unit>

Figure 2:
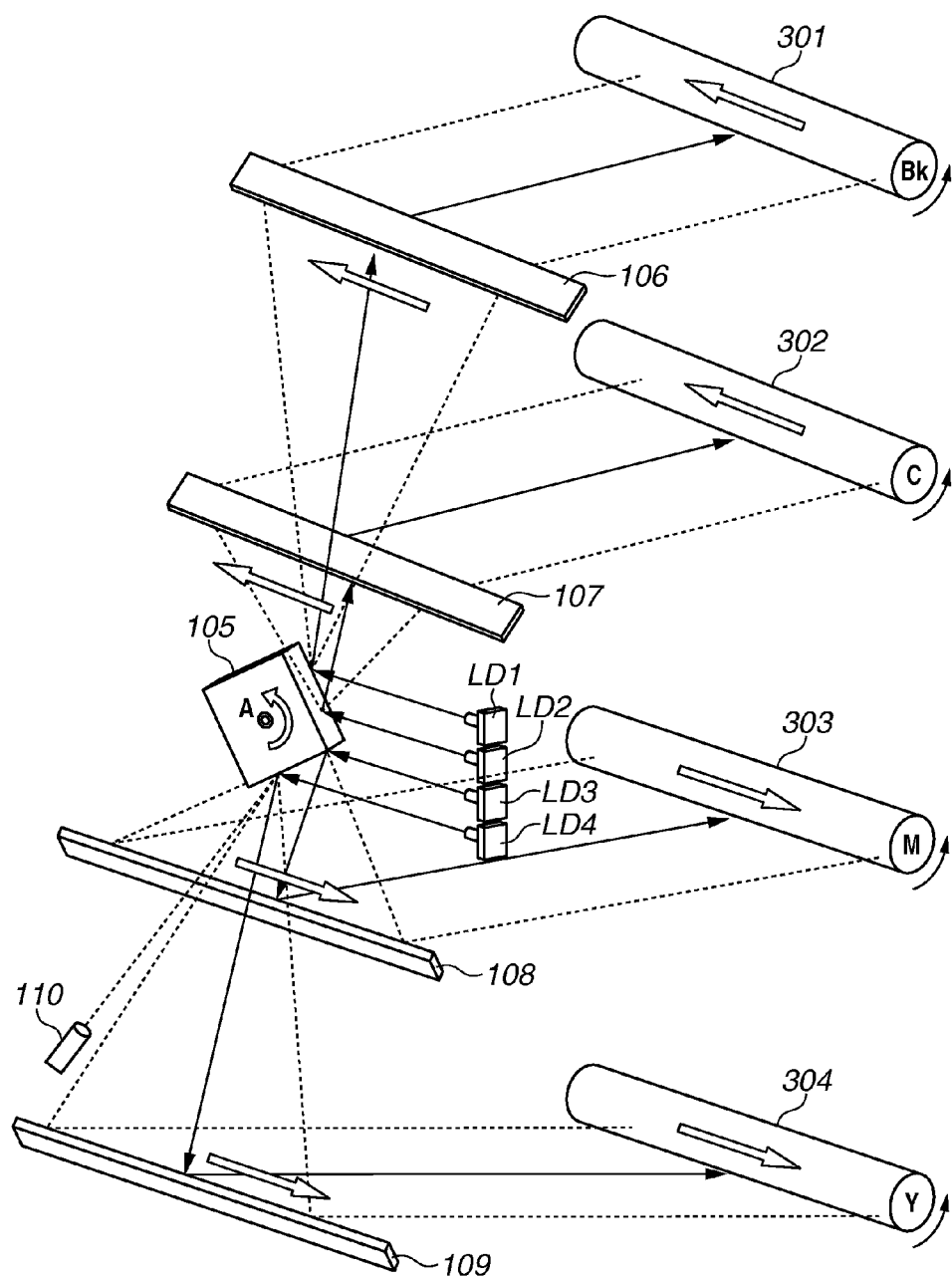
FIG. 2 is a schematic perspective view illustrating a configuration of a scanner unit in the present exemplary embodiment.

Details of the scanner unit 205 in the present exemplary embodiment will be described below with reference to FIG. 2. FIG. 2 is a schematic perspective view illustrating a configuration of the scanner unit 205 in the present exemplary embodiment. Laser diodes LD1 to LD4 illustrated in FIG. 2 respectively scan the photosensitive drums 301 to 304 based on a video signal generated by the video controller 203. The laser diode LD4 corresponds to a first light source according to the present invention, and laser diodes LD1 and LD2 correspond to a second light source according to the present invention. The photosensitive drum 304 corresponds to a first image bearing member according to the present invention, and the photosensitive drums 301 and 302 correspond to a second image bearing member according to the present invention.

A polygon mirror (which may be hereinafter referred to as a polygon) 105 serving as a rotating polygon mirror having a plurality of mirror surfaces rotates in a direction indicated by an arrow A in FIG. 2 using a motor (not illustrated), and deflects and scans respective laser beams emitted from the laser diodes LD1, LD2, LD3, and LD4. A motor, which drives the polygon mirror 105 to rotate, rotates by being controlled to fall within a predetermined speed range in which image formation can be performed in response to an acceleration signal and a deceleration signal in a speed control signal (not illustrated) from the engine controller 204 illustrated in FIG. 1.

The polygon mirror 105 reflects respective laser beams (first laser beams) emitted from the laser diodes LD3 and LD4 on the mirror surface while reflecting respective laser beams (second laser beams) emitted from the laser diodes LD1 and LD2 on the mirror surface different from the mirror surface from which the laser beams from the laser diodes LD3 and LD4 are reflected. In the case, the polygon mirror 105 reflects the laser beams emitted from the laser diodes LD1 and LD2 in a direction different from a direction in which the laser beams emitted from the laser diodes LD3 and LD4 are reflected. Specifically, the polygon mirror 105 irradiates the laser beams emitted from the laser diodes LD3 and LD4 onto the photosensitive drums 303 and 304 and scans the irradiated laser beams while irradiating the laser beams emitted from the laser diodes LD1 and LD2 onto the photosensitive drums 301 and 302 and scans the irradiated laser beams. The laser beams emitted from the laser diodes LD1 and LD2 and the laser beams emitted from the laser diodes LD3 and LD4 enter the different mirror surfaces of the polygon mirror 105 at the same timing.

A BD sensor 110 illustrated in FIG. 2 is arranged at a predetermined position which the laser beam from the laser diode LD4, which has been reflected in a predetermined direction by the polygon mirror 105, enters. The BD sensor 110 receives (detects) the laser beam from the laser diode LD4, and outputs a horizontal synchronizing signal (BD signal) serving as a first signal based on the received laser beam. The horizontal synchronizing signal output by the BD sensor 110 is a signal for determining a timing to form the electrostatic latent image on the photosensitive drum 304, i.e., a signal for determining a timing to emit the laser beam from the laser diode LD4. The BD sensor 110 corresponds to a detection unit and a first generation unit according to the present invention.

The laser beam emitted from the laser diode LD4 is scanned by the rotation of the polygon mirror 105 while being reflected by the polygon mirror 105, and is further reflected from a folding mirror 109, to form an image on the photosensitive drum 304. Thus, the electrostatic latent image is formed on the photosensitive drum 304. Actually, the laser beam passes through various types of lens groups (not illustrated) to be focused on the photosensitive drum 304 or converted into parallel light from diffusion light.

Generally, the video controller 203 illustrated in FIG. 1 transmits a video signal to the engine controller 204 after a predetermined period of time has passed after detecting an output signal of the BD sensor 110. Thus, the image by the laser beam on the photosensitive drum 304 always starts to be written at the same position in a main scanning direction. The main scanning direction means a longitudinal direction of the photosensitive drum.

On the other hand, the laser diodes LD1, LD2, and LD3 respectively form the electrostatic latent images on the photosensitive drums 301, 302, and 303, similarly to the laser diode LD4. The BD sensor 110 is provided on only a scanning optical path of the laser beam from the laser diode LD4, and does not exist on respective scanning optical paths of the laser beams from the laser diodes LD1, LD2, and LD3.

The respective laser beams from the laser diodes LD3 and LD4 enter the same mirror surface of the polygon mirror 105 at the same timing. Thus, a BD signal output from the BD sensor 110 can be used as a horizontal synchronizing signal serving as a reference of a timing to emit the laser light from the laser diode LD3 for forming the electrostatic latent image on the photosensitive drum 303. On the other hand, the respective laser beams from the laser diodes LD1 and LD2 enter the mirror surfaces different from the mirror surface of the polygon mirror 105 which the light from the laser diode LD4 enters at the same timing.

In the present exemplary embodiment, an application specific integrated circuit (ASIC) 402 (see FIG. 3) generates BD signals for the laser diodes LD1 and LD2. A horizontal synchronizing signal serving as a second signal generated by the ASIC 402 is a pseudo horizontal synchronizing signal (hereinafter referred to as a pseudo BD signal) for determining timings to form the respective electrostatic latent images on the photosensitive drums 301 and 302.

In the present exemplary embodiment, the laser beams from the laser diodes LD1 and LD2 enter the same surface of the polygon mirror 105 at the same timing. Thus, a common pseudo BD signal can be used for the laser diodes LD1 and LD2. In the following description, the ASIC 402 generates the pseudo BD signal for the laser diode LD2. The ASIC 402 corresponds to a second generation unit according to the present invention.

As described above, a toner image in yellow Y by the laser diode LD4 including the BD sensor 110 is formed on the photosensitive drum 304. Toner images in black BK, cyan C, and magenta M by the laser diodes LD1, LD2, and LD3 including no BD sensor 110 respectively are formed on the photosensitive drums 301, 302, and 302. Thus, image formation is performed. The foregoing is a series of processes for the image formation.

<Method for Generating Pseudo BD Signal>

Figure 3:
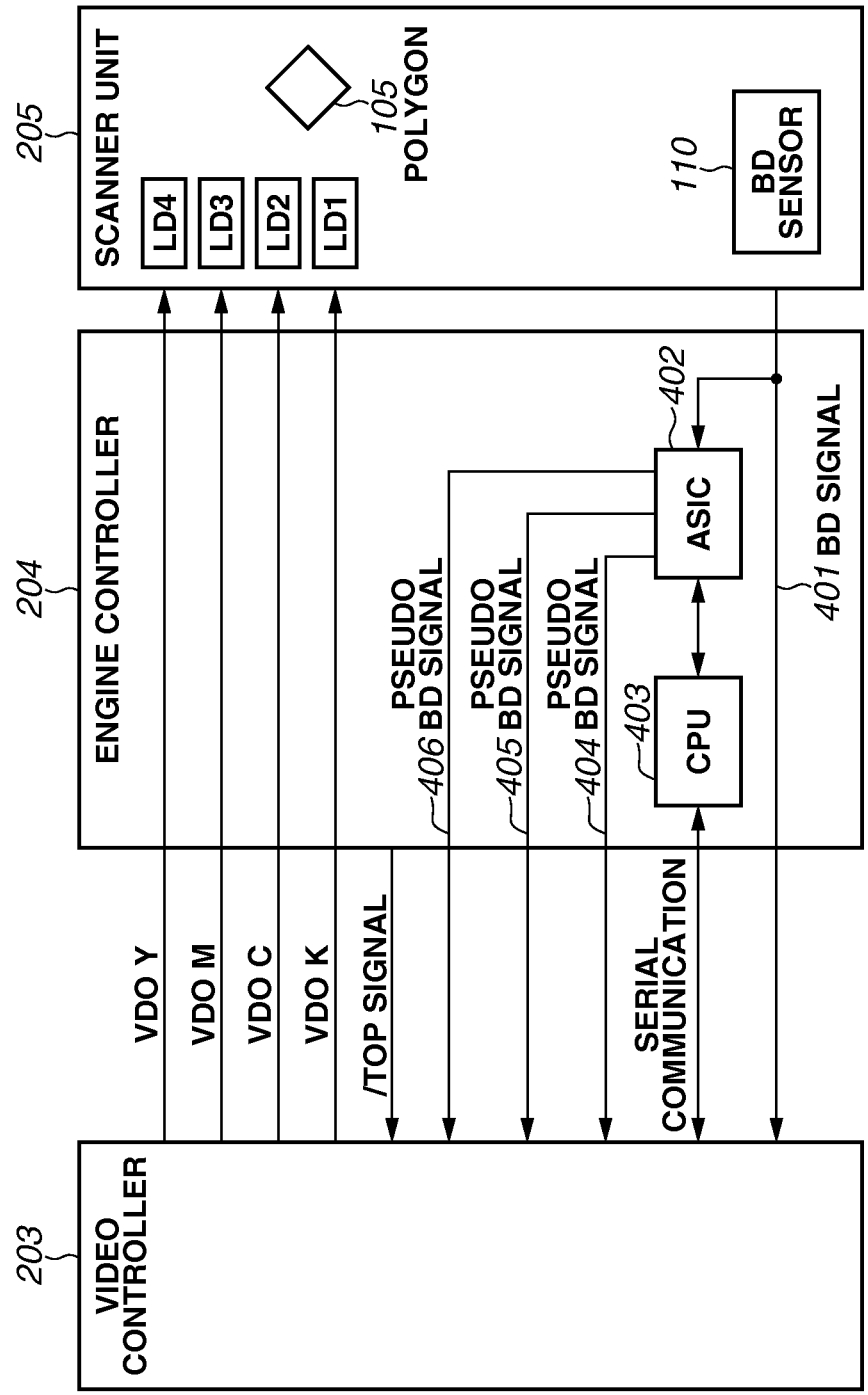
FIG. 3 is a block diagram for illustrating a configuration in a first exemplary embodiment.

A method for generating a pseudo BD signal will be described below with reference to FIG. 3. FIG. 3 is a block diagram for illustrating a configuration in the first exemplary embodiment. The engine controller 204 includes the ASIC 402 and a central processing unit (CPU) 403. The ASIC 402 and the CPU 403 are connected to each other via an address data bus. The ASIC 402 includes circuits for generating pseudo BD signals.

First, a BD signal 401 serving as a horizontal synchronizing signal from the BD sensor 110 is input to the ASIC 402 provided in the engine controller 204 and the video controller 203. The ASIC 402 receives the BD signal 401, calculates a BD period, and transmits a value of the calculated BD period to the CPU 403. The BD period represents a interval between laser beams sequentially detected by the BD sensor 110.

The CPU 403 corrects the BD signal 401 from the value of the BD period to calculate a correction value for generating a pseudo BD signal, and inputs the correction value to the ASIC 402 via the address data bus. The ASIC 402 generates (outputs) a pseudo BD signal 404 based on the correction value and the BD signal 401 from the BD sensor 110. The output pseudo BD signal 404 is input to the video controller 203.

The correction value is used for correcting a difference between a timing to start to form the electrostatic latent image based on the BD signal 401 for the laser diode LD2 and a timing to start to form the electrostatic latent image based on the BD signal 401 for the laser diode LD4. The CPU 403 corresponds to a calculation unit configured to calculate the correction value.

The video controller 203 receives the BD signal 401 output from the BD sensor 110 and the pseudo BD signal 404 output from the ASIC 402. Image data VDOM and VDOY are respectively output to the laser diodes LD3 and LD4 in the scanner unit 205 from the video controller 203 at a predetermined timing after the BD signal 401 is input. The laser diodes LD3 and LD4 respectively emit light based on the image data VDOM and VDOY so that respective electrostatic latent images based on the image data VDOM and VDOY are formed on the photosensitive drums 303 and 304. Similarly, image data VDOK and VDOC are respectively output to the laser diodes LD1 and LD2 in the scanner unit 205 from the video controller 203 at a predetermined timing after the pseudo BD signal 404 is input. The laser diodes LD1 and LD2 respectively emit light based on the image data VDOK and VDOC so that electrostatic latent images based on the image data VDOK and VDOC are formed on the photosensitive drums 301 and 302.

Figure 4:
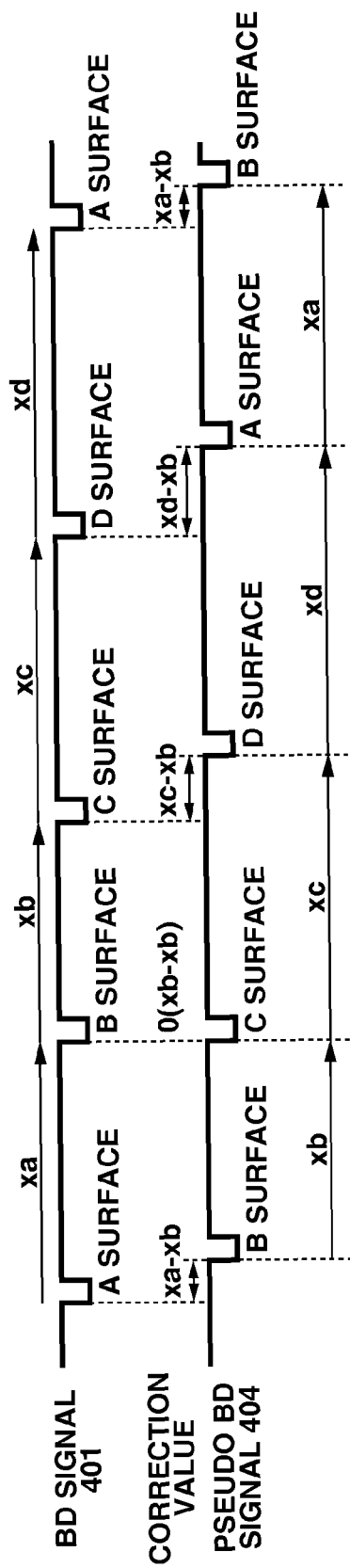
FIG. 4 is a timing chart for illustrating an operation in the first exemplary embodiment.

FIG. 4 is a timing chart for illustrating an operation in the first exemplary embodiment. In the polygon mirror 105, the BD period differs for each of the mirror surfaces due to an error in forming accuracy (plane division error). That is, intervals among the respective laser beams reflected from the mirror surfaces of the polygon mirror 105 and sequentially detected by the BD sensor 110 differ.

In the present exemplary embodiment, the polygon mirror 105 serving as the rotating polygon mirror is square, as viewed from its axis of rotation, and has four mirror surfaces on its side surfaces. The four respective mirror surfaces are referred to as an A surface, a B surface, a C surface, and a D surface.

In the present exemplary embodiment, the BD signal 401 has a BD period xa for the A surface to the B surface, a BD period xb for the B surface to the C surface, a BD period xc for the C surface to the D surface, and a BD period xd for the D surface to the A surface of the polygon mirror 105, which have been measured by the ASIC 402. For example, the BD period xa can be a period of time that has passed until the BD sensor 110 detects the laser beam emitted from the laser diode LD4 and reflected from the B surface since the BD sensor 110 has detected the laser beam emitted from the laser diode LD4 and reflected from the A surface (an interval between the laser beams detected by the BD sensor 110). In the present exemplary embodiment, the shortest BD period (corresponding to a reference interval in the present invention) among the four BD periods is subtracted from the BD period for each of the mirror surfaces, and a value obtained by the subtraction is used as a correction value.

The reason is as follows. When the A surface is used for the BD signal 401, the B surface is used for the pseudo BD signal 404. When the B surface is used for the BD signal 401, the C surface is used for the pseudo BD signal 404. When the C surface is used for the BD signal 401, the D surface is used for the pseudo BD signal 404. When the D surface is used for the BD signal 401, the A surface is used for the pseudo BD signal 404. The correction value is determined from a correspondence between the BD signal 401 and the pseudo BD signal 404. The correction value depends on the polygon mirror 105 and hardly changes with time. Thus, starting the writing from the BD signal 401 remains the same. When it is determined that the correction value is zero for the mirror surface corresponding to the shortest BD period, the reference mirror surface is determined.

Accordingly, when the shortest BD period is xb, the correction value is as follows. A correction value for the pseudo BD signal 404 for the B surface corresponding to the BD signal 401 for the A surface is given by the following equation:

(Period for $A$ surface to $B$ surface of $BD$ signal)−(Shortest $BD$ period)=$xa-xb$ Therefore, the correction value is xa−xb.

A correction value for the pseudo BD signal 404 for the C surface corresponding to the BD signal 401 for the B surface is given by the following equation:

(Period for $B$ surface to $C$ surface of $BD$ signal)−(Shortest $BD$ period)=$xb-xb$ Therefore, the correction value is 0.

A correction value for the pseudo BD signal 404 for the D surface corresponding to the BD signal 401 for the C surface is given by the following equation:

(Period for $C$ surface to $D$ surface of $BD$ signal)−(Shortest $BD$ period)=$xc-xb$ Therefore, the correction value is xc−xb.

A correction value for the pseudo BD signal 404 for the A surface corresponding to the BD signal 401 for the D surface is given by the following equation:

(Period form $D$ surface to $A$ surface of $BD$ signal)−(Shortest $BD$ period)=$xd-xb$ Therefore, the correction value is xd−xb.

The correction value for the pseudo BD signal 404 (the pseudo BD signal 404 for the B surface) corresponding to the BD signal 401 for the A surface is xa−xb. Thus, the pseudo BD signal 404, which is delayed by (xa−xb) from the BD signal 401, is generated and output.

The correction value for the pseudo signal 404 (the pseudo BD signal 404 for the C surface) corresponding to the BD signal 401 for the B surface is 0. Thus, the BD signal 401 itself is output as the pseudo BD signal 404.

The correction value for the pseudo BD signal 404 (the pseudo BD signal 404 for the D surface) corresponding to the BD signal 401 for the C surface is xc−xb. Thus, the pseudo BD signal 404, which is delayed by (xc−xb) from the BD signal 401, is generated and output.

The correction value for the pseudo BD signal 404 (the pseudo BD signal 404 for the A surface) corresponding to the BD signal 401 for the D surface is xd−xb. Thus, the pseudo BD signal 404, which is delayed by (xd−xb) from the BD signal 401, is generated and output.

Thus, the pseudo BD signal 404 is a signal whose timing is delayed by the correction value from the BD signal 401. The pseudo BD signal 404 is output at a timing delayed by a period of time based on the correction value from a timing at which the BD signal 401 is output.

In the generation of the pseudo BD signal, the mirror surface of the polygon mirror 105 which the laser beam emitted from the laser diode LD4 is emitted enters is determined when the BD signal 401 is output. Thus, the correction value is determined from the BD period calculated to correspond to the determined mirror surface. At this time, the BD period differs for each of the mirror surfaces of the polygon mirror 105. Thus, it is possible to specify on which of the mirror surfaces the laser beam from the laser diode LD4 is deflected by calculating the BD period. In the case of the BD signal 401, the pseudo BD signal 404 as illustrated in FIG. 4 is generated. The foregoing is a series of processes for generating the pseudo BD signal.

<Pseudo BD Signal Generation Circuit>

Figure 5:
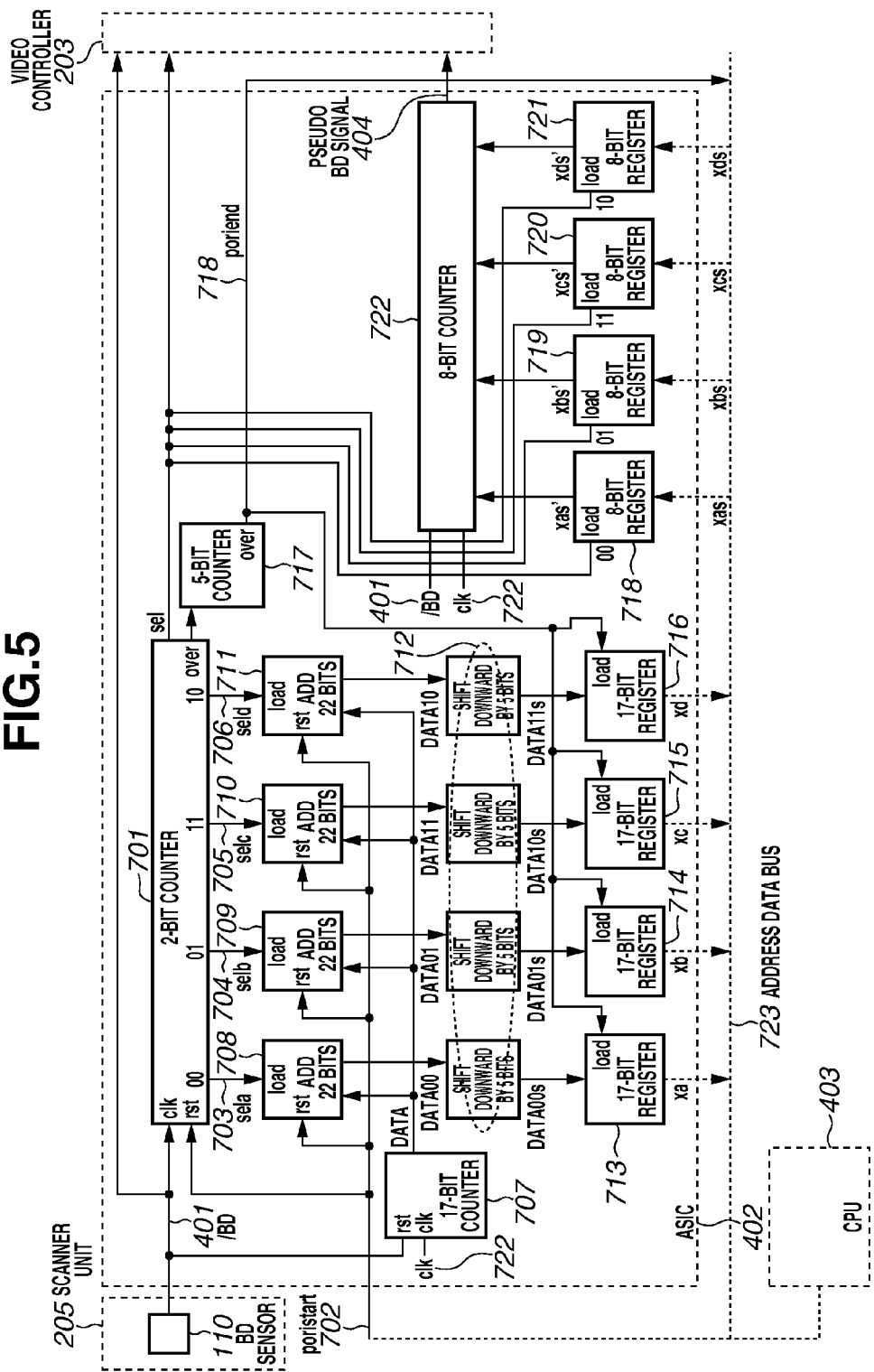
FIG. 5 is a block diagram illustrating a circuit configuration of an application specific integrated circuit (ASIC) in the first exemplary embodiment.

A configuration of circuits provided in the ASIC 402 to generate the pseudo BD signal 404 will be described below with reference to FIGS. 5 and 6. FIG. 5 is a block diagram illustrating a circuit configuration of the ASIC 402 for generating the pseudo BD signal 404 in the first exemplary embodiment. FIG. 6 is a timing chart for determining respective positions by the circuits in the ASIC 402.

First, the BD signal 401 output from the BD sensor 110 and a poristart 702 serving as a signal for starting control to generate the pseudo BD signal 404 (hereinafter referred to as pseudo BD control) are input to a 2-bit counter 701. The poristart 702 is input using the CPU 403 and an ADDRESS-DATABUS 23 serving as a signal line to the ASIC 402 to start the pseudo BD control. The 2-bit counter 701 repeats its count values (DATA) 00, 01, 11, and 10 in this order so as to recognize which of the mirror surfaces of the polygon 105 is irradiated with a laser.

If the A surface is irradiated with the laser when the count value (DATA) is 00, the B surface, the C surface, and the D surface respectively are irradiated with the laser when 01, 11, and 10. When the BD period for the A surface is measured, a sela 703 enters a High level, as illustrated in the timing chart for determining respective positions of polygonal surfaces by the circuits in the ASIC 402 illustrated in FIG. 6. When the BD period for the B surface is measured, a selb 704 enters a High level. When the BD period for the C surface is measured, a selc 705 enters a High level. When the BD period for the D surface is measured, a seld 706 enters a High level.

A 17-bit counter 707 counts the BD period using a clk 722. When the sela 703, the selb 704, the selc 705, and the seld 706 are selected, its count values DATA00, DATA01, DATA11, and DATA10 of the BD periods for the mirror surfaces of the polygon 105 respectively are added 32 times to signs 708, 709, 710, and 711.

To divide, by 32, the count values DATA00, DATA01, DATA11, and DATA10 of the BD periods, which have been added 32 times, to calculate average values per period, the added count values DATA00, DATA01, DATA11, and DATA10 are shifted downward by 5 bits (712), and their respective high-order 5 bits are deleted. Respective obtained count values are stored in 17-bit registers 713, 714, 715, and 716. When it is detected that a 5-bit counter 717 has added the count values of the BD periods for the mirror surfaces of the polygon 105 32 times, a poriend 718 serving as a BD period addition end signal is output. Contents of the 17-bit registers 713, 714, 715, and 716 are the average values of the BD periods. When the poriend 718 is output, the CPU 403 can read average values xa, xb, xc, and xd of the BD periods from 32 times of addition using the ADDRESSDATABUS 723. The CPU 403 can also read the poriend 718 using the ADDRESSDATABUS 723. If it is detected that the poriend 718 is output, therefore, the CPU 403 reads the average values xa, xb, xc, and xd of the BD periods.

The CPU 403 then inputs correction values xas, xbs, xcs, and xds corresponding to the respective mirror surfaces to 8-bit registers 718, 719, 720, and 721 in the ASIC 402 via the ADDRESSDATABUS 723. Each of the sela 703, selb 704, selc 705, and seld 706 selects any correction value. A 8-bit counter 722 outputs the pseudo BD signal 404 to the video controller 203 from the correction values xas', xbs', xcs', and xds'. In the present exemplary embodiment, the correction value is calculated from the average value of the BD period for each of the mirror surfaces of the polygon 105 from 32 times of addition. However, the number of times of addition is not limited to this. If the BD period for each of the mirror surfaces is added 64 times, a count value of the BD period may be shifted downward by 6 bits, and its high-order 5 bits may be deleted.

The foregoing is a description of an internal circuit configuration of the ASIC 402. While the generation of the pseudo BD signal 404 has been described with reference to FIG. 5, respective circuits for generating pseudo BD signals 405 and 406 are also provided in the ASIC 402, and the pseudo BD signals 405 and 406 are generated in a similar method to the method for generating the pseudo BD signal 404.

<Print Sequence>

A print sequence according to the present exemplary embodiment will be described below. In the present exemplary embodiment, control to generate a pseudo BD signal (pseudo BD control) during the startup of the scanner unit 205 is performed, to shorten a first print output time in a full-color mode. A configuration in which the laser diode LD3 (magenta M), and the other laser diodes LD4 (yellow Y), LD2 (cyan C), and LD1 (black BK) align images in the main scanning direction by controlling light emission timings based on a BD signal and a pseudo BD signal, respectively will be described by way of example. A period of time during which the scanner unit 205 is being started up means a period of time that has passed until the polygon mirror 105 reaches steady rotation since it has started to be driven to rotate.

FIG. 7 is a timing chart for illustrating print sequences in the present exemplary embodiment and a comparative example, where FIGS. 7A and 7B respectively are timing charts illustrating a case where pseudo BD control is performed after a scanner unit in the comparative example is started up and a case where pseudo BD control is performed while the scanner unit in the present exemplary embodiment is being started up. The horizontal axis and the vertical axis respectively indicate an elapse of time from the start of printing, and processing sequentially performed by the image forming apparatus. The number of elements and times required for the elements in the figures in the present exemplary embodiment are similar to those in the conventional example. FIGS. 7A and 7B illustrate a case where color printing is performed on one recording medium.

The timing chart in the comparative example illustrated in FIG. 7A will be first described. At T101, the image forming apparatus first starts to start up a scanner motor, start up a fixing device, and start up a high-voltage power source upon receiving a print instruction. The startup of the high-voltage power source is to perform control such that a voltage and a current of the high-voltage power source for each of charging, development, and transfer required for an electrophotographic process reach target values. When the startup of the scanner motor and the startup of the high-voltage power source end, the image forming apparatus starts pseudo BD control at T102. After the pseudo BD control ends at T103, the image forming apparatus starts formation of an image in four colors (yellow Y, magenta M, cyan C, and black Bk) and primary transfer. When this processing ends, the image forming apparatus performs secondary transfer for transferring a toner image formed on the intermediate transfer belt 211 onto a recording medium at T104. At T105, the image forming apparatus uses the fixing device, which has been controlled to a target temperature, then fixes the toner image, which has been transferred onto the recording medium, as a permanent image on the recording medium. When the fixing ends, the image forming apparatus discharges the recording medium onto a sheet discharge tray at T106, and the image formation ends at T107.

The timing chart in the first exemplary embodiment illustrated in FIG. 7B will be described below. A difference between the comparative example illustrated in FIG. 7A and the first exemplary embodiment illustrated in FIG. 7B is a timing to start pseudo BD control. The timing to start the pseudo BD control is after the startup of the scanner motor in FIG. 7A while it is a timing (T200) at which the startup of the scanner motor is started upon receiving a print instruction in FIG. 7B. Thus, in FIG. 7B, the image forming apparatus is performing the pseudo BD control during the startup of a scanner motor. Details of the pseudo BD control during the startup of the scanner motor will be described below. Control of the subsequent secondary transfer, fixing, and discharge is similar to that illustrated in FIG. 7A, and hence description thereof is not repeated. As a result, a timing to start formation of an image in yellow Y is the time when the pseudo BD control ends (T103) in FIG. 7A while being a timing (T202) at which the startup of the scanner motor is completed in FIG. 7B.

A first print output time is a period of time that has passed until the image forming apparatus forms an image on the first recording medium and discharges the recording medium to the outside of the image forming apparatus since it has received a print instruction. The first print output time is a period of time from T100 to T107 when formation of an image in yellow is started after completion of generation of a pseudo BD signal. The first print output time is a period of time from T200 to T207 when formation of an image in yellow is started before completion of generation of the pseudo BD signal. As can be seen from FIGS. 7A and 7B, the first print output time in the present exemplary embodiment is made shorter by a time (Ts) required for the pseudo BD control than in the comparative example.

<Pseudo BD Control During Startup of Scanner>

Figure 8A:
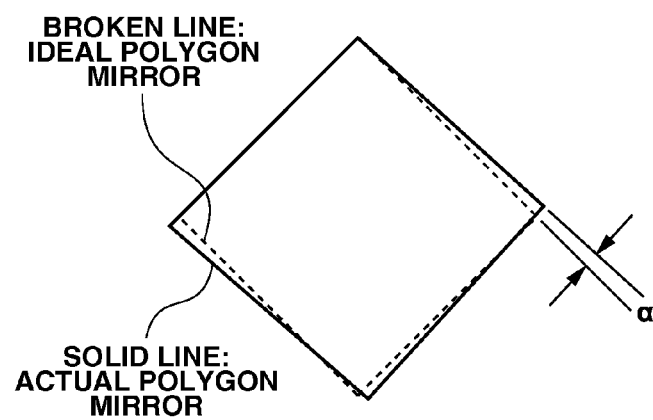
FIGS. 8A, 8B, and 8C illustrate the acceleration of a polygon mirror.

A specific method for implementing pseudo BD control during the startup of the scanner unit 205 will be described with reference to FIGS. 8 and 9. FIG. 8 illustrates the acceleration of the polygon mirror 105. FIG. 9 is a graph illustrating a relationship between a speed and a time when the polygon mirror 105 is driven to rotate.

The time when the startup of the scanner unit 205 ends is the time when the polygon mirror 105 enters a steady rotation state (a state where a rotation speed V converges in a predetermined speed range in which image formation can be performed. In the steady rotation state, a period of time required for a photosensitive drum to be scanned from end to end with a laser beam is substantially constant. In this case, a correction value corresponding to each of the mirror surfaces of the polygon mirror 105 can be calculated by measuring BD periods for the mirror surfaces of the polygon mirror 105 and using the shortest BD period as a reference, as already be described.

However, the number of revolutions of the motor of the scanner unit 205 increases with a lapse of time during the startup of the scanner unit 205. Thus, a period of time during which the mirror surfaces of the polygon mirror 105 is scanned with a laser beam decreases. Therefore, each of the mirror surfaces cannot be scanned with the laser beam at a predetermined speed. Thus, the correction value cannot be calculated in the above-mentioned method for calculating the correction value. A method for calculating the correction value during the startup of the scanner unit 205 will be described below.

When control of the startup of the scanner unit 205 is started, the polygon mirror 105 starts to be driven to rotate, as indicated by a section Tc illustrated in FIG. 9, and the number of revolutions of the polygon mirror 105 increases with a lapse of time.

Figure 8B:
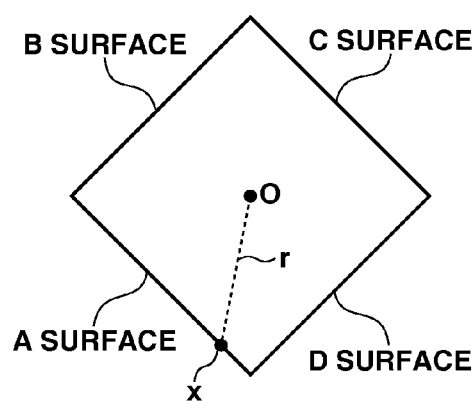
Figure 8C:
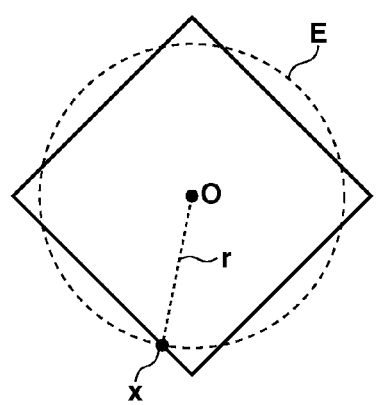

As illustrated in FIG. 8B, a distance between a point O serving as the center of the polygon mirror 105 and a point X serving as a position where the laser beam enters the BD sensor 110 when the A surface of the polygon mirror 105 is scanned with the laser beam is defined as r. As illustrated in FIG. 8C, a locus drawn by the point X when the polygon mirror 105 rotates is a circle E. The circumference of the circle E is $2\pi r$ when the radius of the circle E is r.

A speed at which the point X moves on the circle E is defined as v, a speed v at a certain time t is at (a is a constant), the time when the BD signal for the A surface is detected is defined as ta, and the time when the BD signal for the B surface is detected is defined as tb. In this case, an area S1 illustrated in FIG. 9 represents a distance from a position where the BD signal for the A surface enters the BD sensor 110 to a position where the BD signal for the B surface enters the BD sensor 110. S1 is expressed by the following equation 1:

$$S1 = \int_{ta}^{tb} at\, dt \quad \text{(Equation 1)}$$

According to (Equation 1), even if the number of revolutions of the polygon mirror 105 during the startup of the scanner unit 205 increases, a distance (an interval) between the BD signals during steady rotation of the polygon mirror 105 can be obtained by calculation. Similarly, a period for the A surface to the B surface, a period for the B surface to the C surface, a period for the C surface to the D surface, and a period for the D surface to the A surface of the BD signal can be respectively obtained. Thus, the correction value corresponding to each of the mirror surfaces of the polygon mirror 105 can be calculated by the above-mentioned method for calculating the correction value.

The constant a represents an acceleration of the point X moving on the circumference of the circle E, and is obtained by a method described below. During the startup of the scanner unit 205, the point X moves while increasing the speed v with the time t on the circumference ($2\pi r$) of the circle E. A period of time required for the point X to move on the circumference ($2\pi r$) is obtained from the number of times the BD sensor 110 has detected the BD signal and the time when the BD sensor 110 has detected the BD signal. Accordingly, assuming that the BD signal at any timing in the section Tc where the scanner unit 205 is being started up after starting the startup is the BD signal for the A surface, a period of time required for the point X to move on the circumference ($2\pi r$) in the first revolution is defined as t1, and an average speed of the point X that is moving on the circumference is defined as v1. Similarly, a period of time required for the point X to move on the circumference in the second revolution and an average speed of the point X respectively are defined as t2 and v2, . . . , and a period of time required for the point X to move on the circumference in the n-th revolution and an average speed of the point X respectively are defined as to and vn.

$2\Pi r = t1 \times v1$ in first revolution $2\Pi r = t2 \times v2$ in second revolution

...

$2\Pi r = tn \times vn$ in $n$-th revolution

The acceleration a is represented by a rate of change of a speed per unit time. Thus, accelerations a1 to an−1 can be expressed as follows:

$a1 = (v2 - v1)/t2$ $a2 = (v3 - v2)/t3$

...

$an - 1 = ((vn) - (vn - 1))/tn$

As described above, the acceleration a may be obtained by averaging the above-mentioned accelerations a1 to an−1. The acceleration a can be obtained by the foregoing calculation. Thus, a BD period for each of the mirror surfaces of the polygon mirror 105 that is being accelerated (a detection interval between laser beams) can be obtained by calculation using (Equation 1).

As described above, according to the first exemplary embodiment, the BD period for each of the mirror surfaces of the polygon mirror 105 can also be calculated during the startup of the scanner unit 205, and the pseudo BD signal suitable for each of the mirror surfaces of the polygon mirror 105 can be generated by calculating the correction value.

Figure 10:
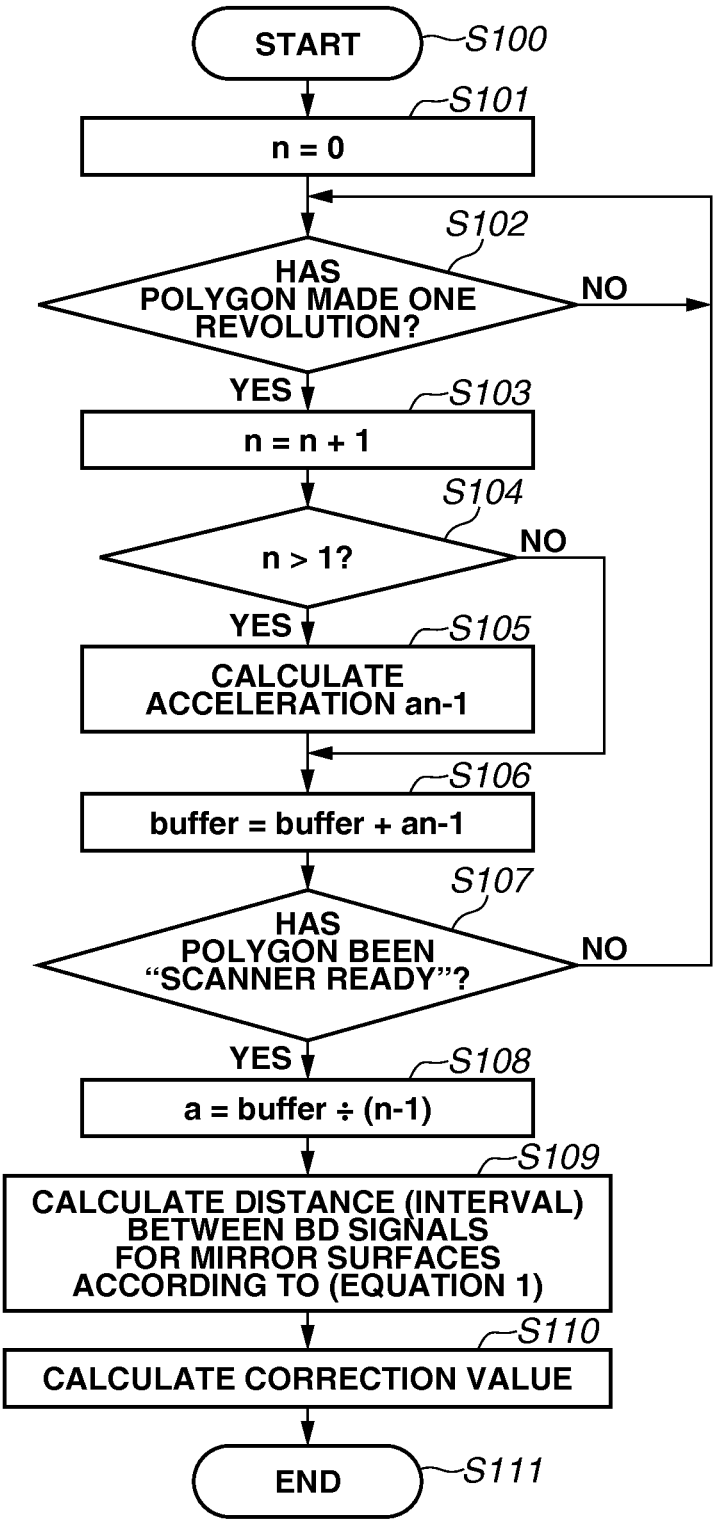
FIG. 10 is a flow of pseudo BD control during the startup of a scanner.

Furthermore, a flow of the pseudo BD control during the startup of the scanner unit 205 will be described with reference to FIG. 10. FIG. 10 is a flowchart for illustrating the pseudo BD control.

In step S100, the pseudo BD control is started when control of the startup of the scanner unit 205 is started. In step S101, the number of revolutions n of the polygon mirror 105 is set to zero. In step S102, it is determined whether the polygon mirror 105 has made one revolution from the number of times the BD signal has been detected. If the polygon mirror 105 has made one revolution (YES in step S102), then in step S103, the number of revolutions n of the polygon mirror 105 is set to (n+1). In step S104, it is determined whether the number of revolutions n of the polygon mirror 105 is more than 1. If the number of revolutions n of the polygon mirror 105 is more than 1 (YES in step S104), then in step S105, an acceleration an−1 is calculated. In step S106, the acceleration an−1 is added to a buffer provided in a random access memory (RAM) in the CPU 403.

In step S107, it is then determined whether the number of revolutions n of the polygon mirror 105 has reached a predetermined number of revolutions. "The number of revolutions of the polygon mirror 105 has reached the predetermined number of times" is referred to as "the polygon mirror 105 has been scanner ready". A speed at the time when the polygon mirror 105 has been "scanner ready" is defined as Vrdy. If the polygon mirror 105 has been "scanner ready" (YES in step S107), then in step S108, a=buffer/(n−1) is calculated, to obtain the acceleration a.

In step S109, a distance (interval) between the BD signals for the mirror surfaces of the polygon mirror 105 is then obtained from (Equation 1), to set the mirror surface for which the distance between the BD signals is the shortest to a reference surface. A BD period between the BD signals is calculated from the distance between the BD signals for the mirror surfaces and the speed Vrdy. In step S110, a correction value is calculated by subtracting the BD period for the reference surface from the BD period for each of the mirror surfaces, as described above. In step S111, the pseudo BD control then ends.

As described above, according to the first exemplary embodiment, when the scanner unit 205 is started up (while the polygon mirror 105 is being accelerated), the correction value can also be calculated by calculating the BD period for each of the mirror surfaces of the polygon mirror 105 based on the output of the BD sensor 110. Accordingly, the image formation can be started immediately after the polygon mirror 105 enters a steady rotation state. Therefore, the first print output time can be made short compared with a configuration in which the BD period is measured to generate the pseudo BD signal after the polygon mirror 105 reaches steady rotation. The correction value may be calculated at least based on the BD signal output while the polygon mirror 105 is being accelerated or may be calculated based on the BD signal output while the polygon mirror 105 is being accelerated and the BD signal output after the polygon mirror 105 reaches steady rotation. In this case, the correction value for the pseudo BD signal can be calculated more early and the first print output time can be made short compared with in a configuration in which measurement of the BD period is started to generate the pseudo BD signal after the polygon mirror 105 reaches steady rotation.

Figure 11:
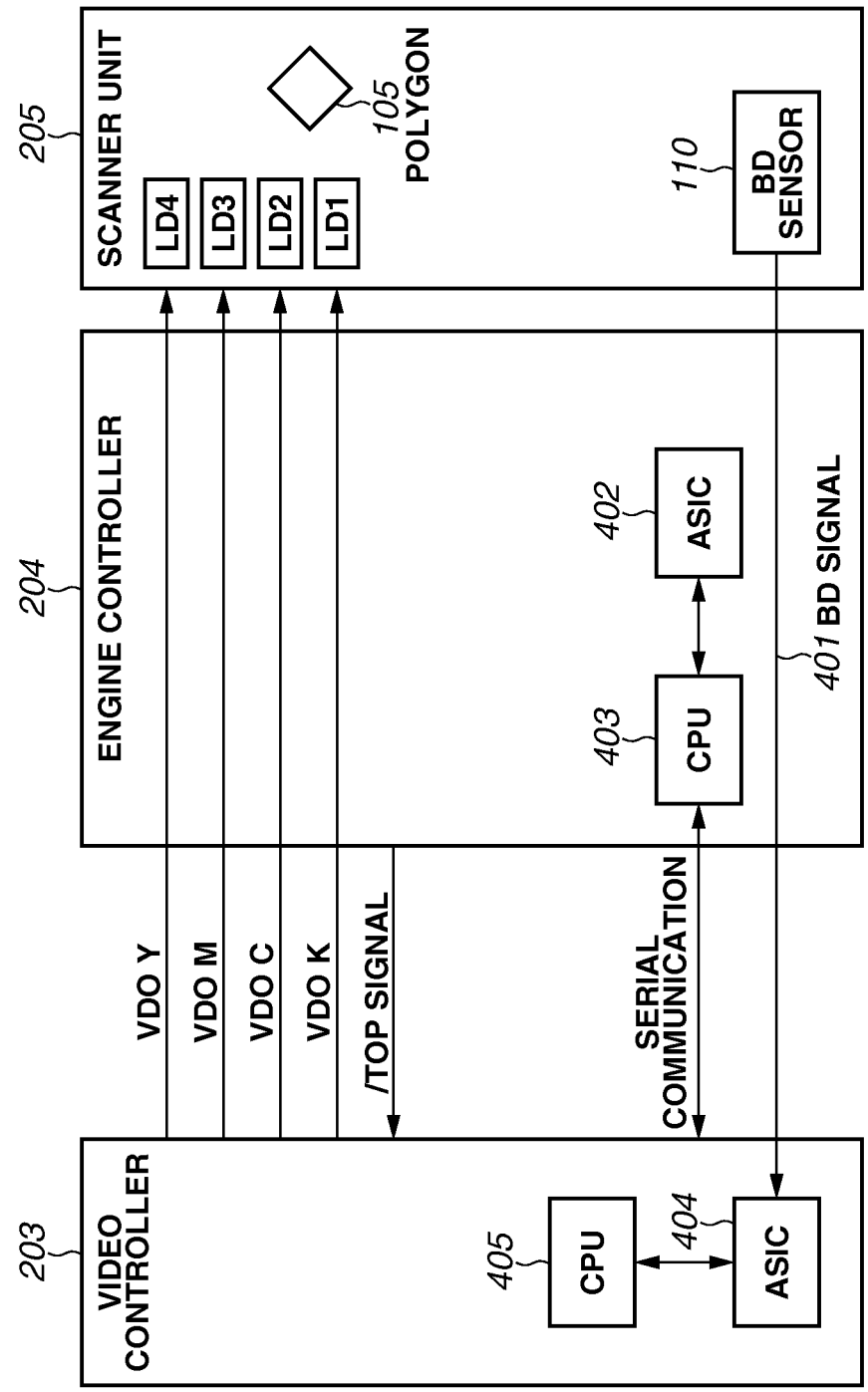
FIG. 11 illustrates a configuration of a system for generating a pseudo BD signal in a second exemplary embodiment.
Figure 12:
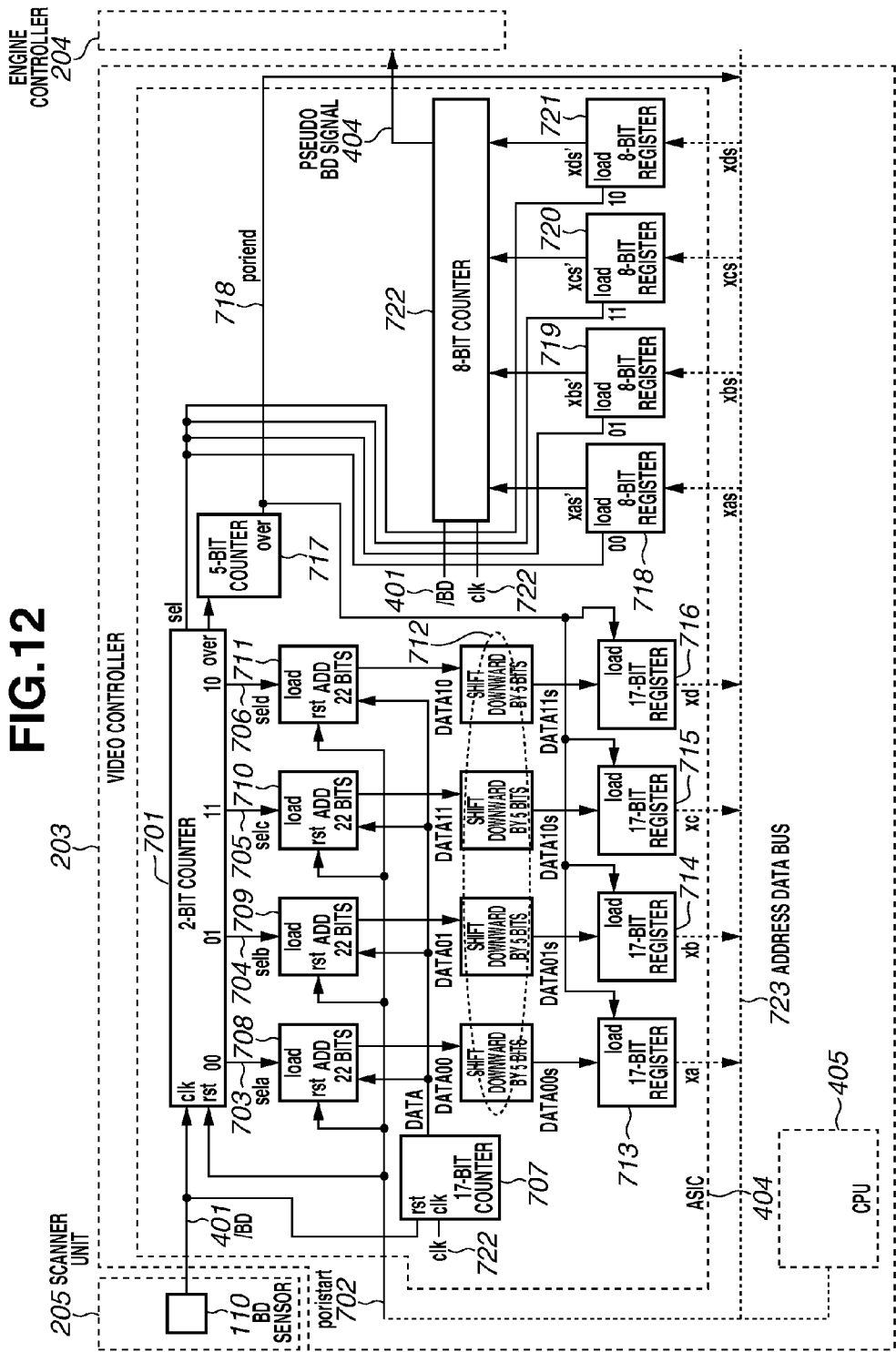
FIG. 12 is a block diagram illustrating a circuit configuration of an ASIC in the second exemplary embodiment.

A second exemplary embodiment of the present invention will be described below with reference to FIGS. 11 and 12. FIG. 11 illustrates a configuration of a system for generating a pseudo BD signal in the second exemplary embodiment. FIG. 12 is a block diagram illustrating a configuration of an ASIC in the second exemplary embodiment. The video controller 203 includes the ASIC 404 and the CPU 405. The ASIC 404 and the CPU 405 are connected to each other via an address data bus. The ASIC 404 includes circuits for generating pseudo BD signals serving as a second signal.

The BD signal 401 serving as a first signal serving as a horizontal synchronizing signal from the BD sensor 110 serving as a detection unit is input to the ASIC 404 provided in the video controller 203. The video controller 203 starts pseudo BD control when it is notified to start control of the startup of the scanner unit 205 from an engine controller 204 via serial communication. The ASIC 404 receives the BD signal 401, and calculates a BD period. The CPU 405 calculates a correction value for a pseudo BD signal from the BD period. The correction value is input to the ASIC 404 via the ADDRESSDATABUS 723.

The ASIC 404 can generate pseudo BD signals (not illustrated) for light sources other than a light source provided with the BD sensor 110. When the startup of the scanner unit 205 is completed, the engine controller 204 notifies the video controller 203 that the startup of the scanner unit 205 is completed, via serial communication. The video controller 203 notifies the engine controller 204 of the end of the pseudo BD control at a timing at which the pseudo BD control has ended.

The engine controller 204 outputs a /TOP signal serving as a reference timing to output a video signal, and the video controller 203 outputs image data VDOK, VDOC, VDOM, and VDOY to the laser diodes LD1, LD2, LD3, and LD4 in the scanner unit 205, respectively. Respective images are formed on the intermediate transfer belt 211, and is printed on a recording medium based on the image data VDOK, VDOC, VDOM, and VDOY.

An internal circuit configuration of the ASIC 404 will be described below with reference to FIG. 12. The BD signal 401 and the poristart 702 serving as a signal using the CPU 405 and the ADDRESSDATABUS 723 serving as a signal line to the ASIC 404 to start the pseudo BD control are input to the 2-bit counter 701. The poristart 702 is a signal for starting the pseudo BD control. The 2-bit counter 701 repeats its count values (DATA) 00, 01, 11, and in this order so as to recognize which of mirror surfaces of a polygon mirror 105 is irradiated with a laser.

If the A surface is irradiated with the laser when the count value (DATA) is 00, the B surface, the C surface, and the D surface, respectively are irradiated with the laser when 01, 11, and 10. Consequently, when a BD period for the A surface is measured, the sela 703 enters a High level, as illustrated in the timing chart for determining respective positions of polygonal surfaces by the circuits in the ASIC 402 illustrated in FIG. 6. When a BD period for the B surface is measured, the selb 704 enters a High level. When a BD period for the C surface is measured, the selc 705 enters a High level. When a BD period for the D surface is measured, the seld 706 enters a High level.

A 17-bit counter 707 then counts the BD period using the clk 722. When the sela 703, the selb 704, the selc 705, and the seld 706 are selected, its count values DATA00, DATA01, DATA11, and DATA10 of the BD periods for the mirror surfaces of the polygon 105 are added 32 times to the signs 708, 709, 710, and 711, respectively. To divide, by 32 the count values DATA00, DATA01, DATA11, and DATA10 of the BD periods, which have been added 32 times, to calculate average values per period, the added count values DATA00, DATA01, DATA11, and DATA10 are shifted downward by 5 bits (712), and their respective high-order 5 bits are deleted. Respective obtained count values are stored in the 17-bit registers 713, 714, 715, and 716. When it is detected that the 5-bit counter 717 has added the count values of the BD periods for the mirror surfaces of the polygon 105 32 times, the poriend 718 serving as a BD period addition end signal is output.

Contents of this 17-bit registers 713, 714, 715, and 716 are the average values of the BD periods. When the poriend 718 is output, the CPU 405 can read average values xa, xb, xc, and xd of the BD periods from 32 times of addition using the ADDRESSDATABUS 723. The CPU 405 can also read the poriend 718 using the ADDRESSDATABUS 723. If it is detected that the poriend 718 is output, therefore, the CPU 405 reads the average values xa, xb, xc, and xd of the BD periods.

The CPU 405 then inputs correction values xas, xbs, xcs, and xds corresponding to the respective polygonal surfaces to 8-bit registers 718, 719, 720, and 721 in the ASIC 404 via the ADDRESSDATABUS 723. Each of the sela 703, selb 704, selc 705, and seld 706 selects any correction values. A 8-bit counter 722 outputs the pseudo BD signal 404 from the correction values xas', xbs', xcs', and xds'. In the present exemplary embodiment, the correction value is calculated from the average values of the BD periods for each of the mirror surfaces of the polygon 105 from 32 times of addition. However, the number of times of addition is not limited to this. If the BD period for each of the mirror surfaces is added for 64 times, a count value of the BD period may be shifted downward by 6 bits, and its high-order 5 bits may be deleted.

The foregoing is a description of a circuit block diagram in the ASIC 404 in the second exemplary embodiment. While the generation of the pseudo BD signal 404 has been described with reference to the circuit block diagram, similar respective circuit blocks for generating the pseudo BD signal 405 and the pseudo BD signal 406 are also provided in the ASIC 404, and the pseudo BD signals 405 and 406 are generated in a method similar to the method for generating the pseudo BD signal 404.

A method for calculating the BD period for each of the mirror surfaces of the polygon mirror 105 during the startup of the scanner unit 205 and a method for calculating the correction value corresponding to each of the mirror surfaces of the polygon mirror 105 are similar to the methods in the first exemplary embodiment. Details of the pseudo BD control during the startup of the scanner unit 205 are illustrated in the flowchart illustrated in FIG. 10, like in the first exemplary embodiment. In step S100, the video controller 203 first starts the pseudo BD control when it is notified to start control of the startup of the scanner unit 205 by the engine controller 204. The subsequent flow is similar to that in the first exemplary embodiment.

As described above, according to the second exemplary embodiment, the BD period for each of the mirror surfaces of the polygon mirror 105 can also be calculated during the startup of the scanner unit 205, and the video controller 203 generates the pseudo BD signal. Thus, the image formation can be started immediately after the polygon mirror 105 reaches steady rotation. Therefore, the first print output time can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-031723 filed Feb. 21, 2014, which is hereby incorporated by reference herein in its entirety.

What is claimed is:

1. An image forming apparatus comprising:
    a first light source configured to emit a first laser beam and a second light source configured to emit a second laser beam;
    a first image bearing member and a second image bearing member configured to bear a developer image;
    a rotating polygon mirror configured to rotate and reflect the first laser beam and the second laser beam to scan the first bearing member with the first laser beam and scan the second bearing member with the second laser beam, a mirror surface reflecting the second laser beam is different from a mirror surface reflecting the first laser beam at the same time, a direction of reflecting the second laser beam is different from a direction of reflecting the first laser beam at the same time;
    a detection unit configured to detect the first laser beam reflected from each of the mirror surfaces by rotation of the rotating polygon mirror, to output a signal;
    a first generation unit configured to generate a first signal for determining a timing to form an electrostatic latent image on the first image bearing member with the first laser beam based on timings at which the respective first laser beams, which have been reflected from the mirror surfaces, are sequentially detected by the detection unit;
    a second generation unit configured to generate a second signal for determining a timing to form an electrostatic latent image on the second image bearing member with the second laser beam reflected from the mirror surface different from the mirror surface reflecting the first laser beam based on the first signal and a correction value; and
    a calculation unit configured to calculate the correction value based on the output of the detection unit,
    wherein the calculation unit calculates the correction value based on the signal output from the detection unit in a period of time that has passed until the rotating polygon mirror reaches steady rotation since it has started to be driven to rotate.

2. The image forming apparatus according to claim 1, wherein the calculation unit obtains each of intervals among the respective laser beams reflected from the mirror surfaces during the steady rotation of the rotating polygon mirror and sequentially detected by the detection unit from an acceleration of the rotation of the rotating polygon mirror, and calculates the correction value from a difference between each of the intervals and a reference interval among the intervals.

3. The image forming apparatus according to claim 2, wherein the reference interval is a shortest interval among the intervals.

4. The image forming apparatus according to claim 1, wherein the second signal is output at a timing delayed by a period of time based on the correction value from a timing at which the first signal is output.

5. The image forming apparatus according to claim 1, wherein the detection unit is a sensor arranged on an optical path of the first laser beam reflected from the mirror surface of the rotating polygon mirror.

6. The image forming apparatus according to claim 1, wherein the rotating polygon mirror has the four mirror surfaces.

7. The image forming apparatus according to claim 1, further comprising:
    a charging unit configured to charge respective surfaces of the first image bearing member and the second image bearing member; and
    a development unit configured to supply a developer to the electrostatic latent image formed by scanning the first image bearing member and the second image bearing member charged by the charging unit with the first laser beam and the second laser beam, to form the developer image.

8. The image forming apparatus according to claim 1, further comprising an endless belt configured to contact each of the first image bearing member and the second image bearing member.

* * * * *